United States Patent [19]

Blakeley et al.

[11] Patent Number: 5,122,704
[45] Date of Patent: Jun. 16, 1992

[54] COMPOSITE ROTOR SLEEVE

[75] Inventors: Anthony Blakeley; Clarence F. Dolan, both of Rockford; Walter Iseman, Monroe Center, all of Ill.

[73] Assignee: Sundstrand Corporation, Rockford, Ill.

[21] Appl. No.: 603,161

[22] Filed: Oct. 25, 1990

[51] Int. Cl.⁵ .................. H02K 9/19; H02K 15/10; H02K 1/32; H02K 1/22
[52] U.S. Cl. .................... 310/54; 310/43; 310/192; 310/262; 310/271
[58] Field of Search .......... 310/43, 45, 52, 54, 310/61, 85, 86, 88, 192, 214, 262, 271

[56] References Cited

U.S. PATENT DOCUMENTS

| | | | |
|---|---|---|---|
| 3,781,578 | 12/1973 | Smith, Jr. et al. | 310/52 |
| 4,143,290 | 3/1979 | Mizukami et al. | 310/270 |
| 4,146,809 | 3/1979 | Rielly | 310/261 |
| 4,152,611 | 5/1979 | Madsen | 310/61 |
| 4,251,745 | 2/1981 | Germann | 310/52 |
| 4,311,932 | 1/1982 | Olson | 310/61 |
| 4,433,261 | 2/1984 | Nashiki et al. | 310/271 |
| 4,531,071 | 7/1985 | Kintz, Jr. et al. | 210/261 |
| 4,930,201 | 6/1990 | Brown | 310/271 |

FOREIGN PATENT DOCUMENTS

| | | | |
|---|---|---|---|
| 0648623 | 9/1962 | Canada | 310/271 |
| 0307663 | 3/1989 | European Pat. Off. | 310/51 |
| 1143575 | 2/1969 | United Kingdom | 310/271 |

OTHER PUBLICATIONS

Du Pont, "Technical Information", Feb. 1967, pp. 7–8.

Primary Examiner—Steven L. Stephan
Assistant Examiner—C. La Balle
Attorney, Agent, or Firm—Wood, Phillips, Van Santen, Hoffman & Ertel

[57] ABSTRACT

Leakage of a coolant into the air gap (16) of a dynamoelectric machine so as to cause undesirable windage losses may be avoided through the use of a composite rotor sleeve (44) including a continuous film (46) of polyimide material on its radially inner surface and surrounding the machine rotor (22).

12 Claims, 2 Drawing Sheets

FIG. 5 HELICAL WINDING

FIG. 6 HOOP WINDINGS / AXIAL WINDINGS / BIAXIAL WINDING

COMPOSITE ROTOR SLEEVE

FIELD OF THE INVENTION

This invention relates to sleeves utilized in dynamoelectric machines on the rotors thereof for winding containment against centrifugal forces encountered during machine operation, and more specifically, to a composite sleeve for such purpose that additionally prevents rotor coolant from weeping through the rotor into the air gap between the rotor and the stator to cause so-called "windage losses".

BACKGROUND OF THE INVENTION

In many applications such as in airborne electrical systems, size and weight of dynamoelectric machines such as electrical generators are of considerable concern. If the machine is undesirably large, it may prevent the use of a most desirable aerodynamic configuration for an engine nacelle with the result that an aerodynamic design with greater than desired drag must be used. As the weight of the machine increases, all other things being equal, the useful load of the aircraft is reduced. In either case, the aircraft cannot be operated as efficiently as would be the case if the machine was of small size and relatively low weight.

In order to minimize size and weight of aircraft generators, the number of poles in the generator have been reduced. Consequently, there are presently aircraft generators that operate at 24,000 rpm necessary with a two-pole generator to generate the desired 400 Hz alternating current power universally employed on all but the smallest aircraft.

As is well-known, centrifugal force in a rotating body is proportional to the angular velocity or rate of rotation of the same. Thus, it will be readily appreciated that high centrifugal forces result during the operation of such high speed generators and it is necessary to provide a means of containment of rotor components, most notably windings, during generator operation. A common means of providing the desired containment is through the use of a containment sleeve surrounding the rotor periphery and fronting on the air gap between the rotor and the stator.

In order to minimize interference with the magnetic fields present during generator operation that would reduce generator efficiency, it is necessary that the sleeve be of a non-magnetic material. At the same time, the sleeve should have minimal thickness since it appears to the magnetic flux path to be part of the air gap between the rotor and the stator; and the greater the air gap, the greater the reduction in generator efficiency.

In addition to operating at high rotational speeds, such generators are designed to operate at what might be termed a high power density, which is to say that large electrical currents are flowing in closely grouped conductors. As a consequence, substantial heat is present and such generators typically provide some sort of means for flowing a coolant through the rotor in heat exchange relation with the windings to prevent overheating to the point where insulation between the windings would be destroyed or otherwise damaged. While in some cases special conduits may be formed in the rotor core itself to conduct the coolant, typically oil, this may be undesirable for any of a variety of reasons. For one, the conduits may interfere with magnetic flux paths and either reduce generator efficiency or necessitate a somewhat larger rotor in order to achieve the desired flux path. Neither is acceptable and as a consequence, and as more fully described in commonly assigned, co-pending U.S. Pat. No. 4,647,804 issued Mar. 3, 1987 to Wefel, it is advantageous to employ windings made of round wires so that axially elongated interstices between adjacent winding exist along the length of the rotor. The coolant may then be flowed through such interstices in intimate contact with the windings to provide excellent cooling. Such coolant flow paths do not interfere with magnetic flux pattern, nor do they require special fabrication techniques. At the same time, because the rotor core typically will be made up of a series of laminations, and in view of the high centrifugal forces present during operation, the coolant will have a tendency to weep radially outwardly through the interfaces of adjacent laminations. If the containment sleeve is not such as to contain the weeping coolant, it will find its way to the air gap and create highly undesirable so-called "windage losses".

It will also be appreciated that when such generators are quiescent, or even operating under substantially no load, they may be at ambient temperatures which, in the case of aircraft, can be quite low. At the same time, under high loading conditions, where oil is used as a coolant, they may operate at much higher temperatures so long as such temperatures are somewhat short of the boiling point of the coolant.

Unlike generators at fixed power stations, aircraft generators are cycled between off or quiescent, non-operating conditions and operating conditions at substantial loads. The result is frequent thermal cycling of the generator components that are subjected to high heat as a result of the electrical currents flowing during operation. This can result in relative movement between the rotor and the containment sleeve and/or the generation of substantial thermal stresses and the ultimate failure of a containment sleeve.

The present invention is directed to overcoming one or more of the above problems.

SUMMARY OF THE INVENTION

It is the principal object of the invention to provide a new and improved, high speed dynamoelectric machine. More specifically, it is an object of the invention to provide such a dynamoelectric machine wherein a liquid cooled rotor may be employed without fear of liquid coolant weeping to the machine air gap and causing windage losses. It is also an object of the invention to provide a new and improved generator structure wherein relative movement and/or stresses between a rotor and a containment sleeve as a result of thermal cycling are avoided.

A first facet of the invention achieves these objects in a dynamoelectric machine construction including a rotor adapted to be journaled for high speed rotation about an axis. Electrical windings are carried by the rotor and means are provided for defining a flow path for coolant through the rotor in heat exchange relation with the windings. A composite sleeve including fibrous material surrounds the rotor and contains the windings during high speed rotation of the rotor. A continuous film of polyimide material is located on the interior of the sleeve and is interposed between the sleeve and the rotor for preventing the coolant from the flow path from passing through the sleeve.

According to a preferred embodiment of the invention, the continuous film is defined by a helically wound ribbon of film having its edges sealed with an adhesive A preferred embodiment of the invention contemplates that the adhesive be a polyimide adhesive.

In a preferred embodiment, the sleeve and the film are shrink fitted on the rotor. It is also contemplated that the sleeve and the film be bonded to one another.

According to another facet of the invention, there is provided a dynamoelectric machine with a rotor provided with electrical winding as before along with a composite sleeve including fibers in a matrix of resin surrounding a rotor and containing the windings during high speed rotation of the rotor. The fibers are wound within the sleeve in a plurality of plies at differing angles to the axis of rotation of the rotor. They are formed of a material having a first coefficient of thermal expansion while the resin has a second and different coefficient of thermal expansion. At least one of the angles is chosen so that the composite sleeve has a third coefficient of thermal expansion that is about equal to the coefficient of thermal expansion of the rotor.

In one embodiment, the first coefficient of thermal expansion is a negative coefficient of thermal expansion while the second coefficient of thermal expansion is a positive one. Typically, the fibrous material will be carbon fiber while the resin preferably is a polyimide resin.

In a highly preferred embodiment, the chosen angle is in a $\pm$ range between 0° and 90° and more preferably is in the $\pm$ range between 90° and 45°. In a highly preferred embodiment, the angle is $\pm 65°$.

Other objects and advantages will become apparent from the following specification taken in connection with the accompanying drawings.

DESCRIPTION OF THE DRAWINGS

FIG. 5 is an elevation illustrating one possible fiber winding pattern; and

FIG. 6 is an elevation illustrating another possible fiber winding pattern.

DESCRIPTION OF THE PREFERRED EMBODIMENT

Figure 1:
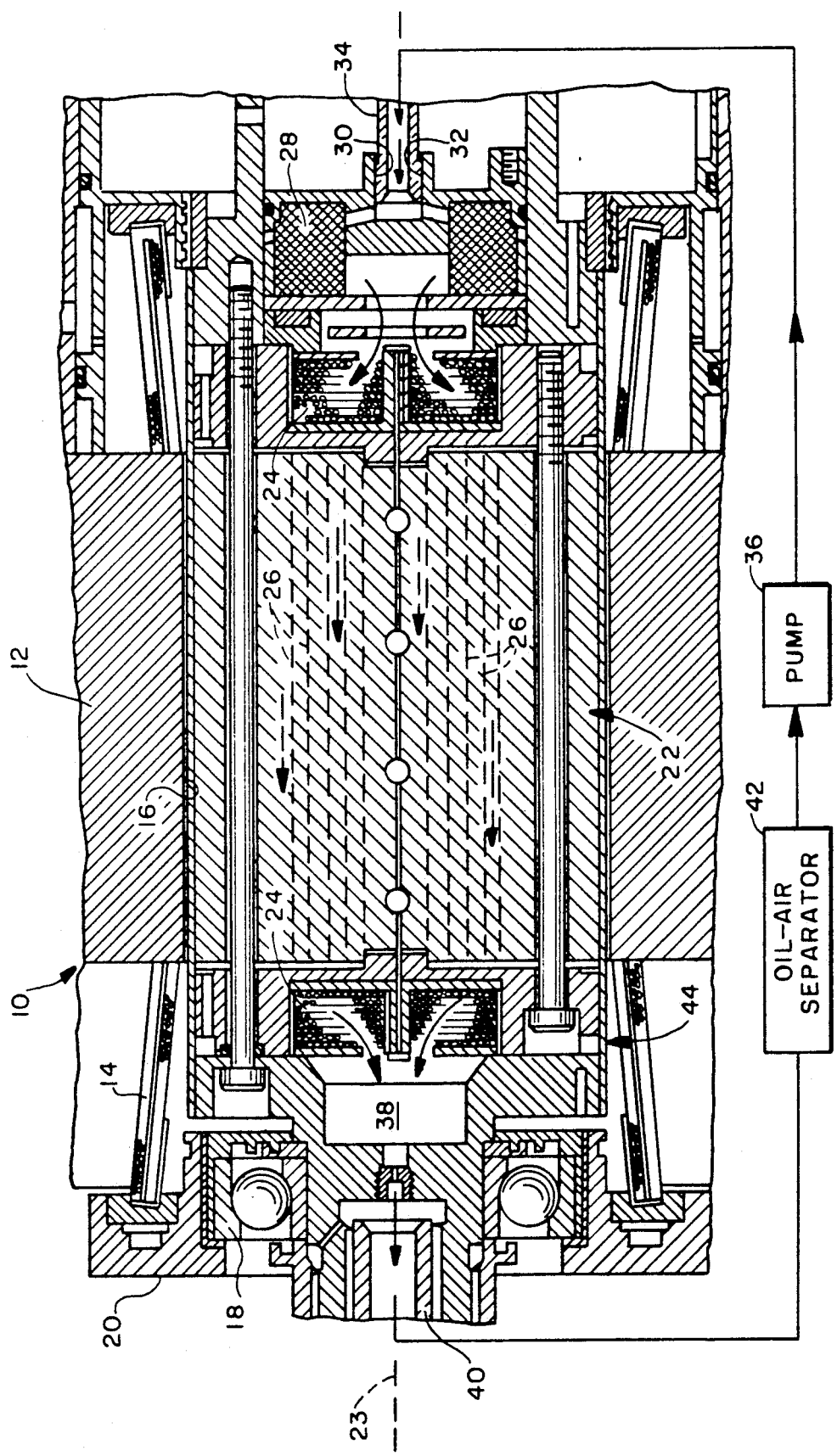
FIG. 1 is a fragmentary, sectional view of a dynamoelectric machine, specifically, a 24,000 rpm, two-pole electrical generator, made according to the invention.

An exemplary embodiment of a dynamoelectric machine made according to the invention is illustrated in FIG. 1 and is generally in the form illustrated in the previously identified Wefel patent, the details of which are herein incorporated by reference. For purposes of the present disclosure, it is sufficient to note that the machine includes a stator armature, generally designated 10, having a core 12 of ferrous material, windings, the end turns 14 of which are shown, and an opening defining a rotor/stator air gap 16. Bearings 18 mounted within a housing component 20 journal one end of a rotor, generally designated 22, while other bearings (not shown) journal the opposite end of the rotor. The rotor rotational axis is designated 23.

As more fully explained in the Wefel patent, the machine is a so-called brushless generator and the rotor 22 includes windings, the end turns of which are shown at 24. The windings 24 extend from end to end of the rotor and are formed of round wire thus resulting in interstices which define a plurality of coolant flow paths schematically illustrated at 26 extending from end to end of the rotor 22 in heat exchange relation with the windings 24. However, the invention is applicable to rotors having flow paths separate from such interstices.

One end 28 of the rotor includes an axially centered opening 30 which receives one end 32 of a conventional transfer tube 34. The transfer tube 34 is in turn connected to a pump 36 which pumps a coolant, typically oil, into the flow paths 26 via the transfer tube 34 as illustrated by the various arrows shown in FIG. 1. The oil exits the flow paths 26 into a gallery 38 within the rotor from which it may ultimately flow to a port 40 connected to an air-oil separator 42 which in turn provides make up oil to the pump 36 for further circulation. A heat exchanger (not shown) will also be included in the circuit to provide for cooling of the oil once it exits the rotor.

The rotor 22, as seen in FIG. 1, is surrounded by a containment sleeve, generally designated 44 which extends from end to end of the rotor. The containment sleeve is preferably prefabricated and placed in an interference fit about the rotor 22 within the air gap 16. In the usual case, the sleeve 44 will be maintained at a suitable temperature not less than about ambient temperature while the rotor 22 will be cooled sufficiently as to allow its insertion into the sleeve 44. Upon the rotor 22 warming to the temperature of the sleeve 44, the interference fit will be present with the sleeve 44 exerting a compressive force against the rotor 22.

Figure 2:
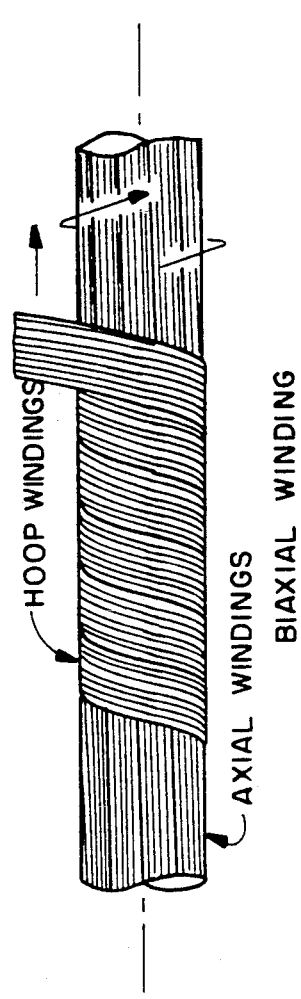
FIG. 2 is an enlarged, fragmentary cross section of a rotor-stator interface in the dynamoelectric machine.
Figure 2:
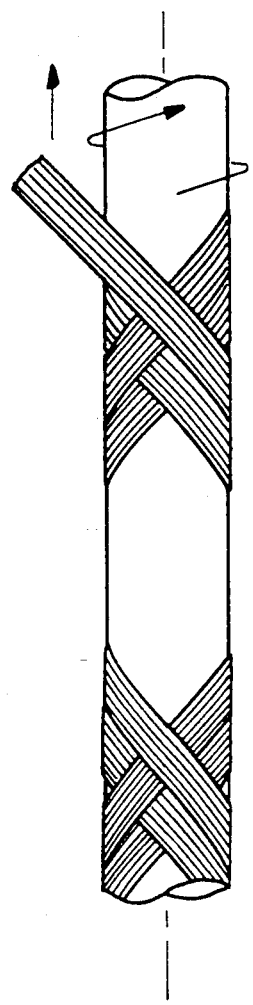
Figure 2:
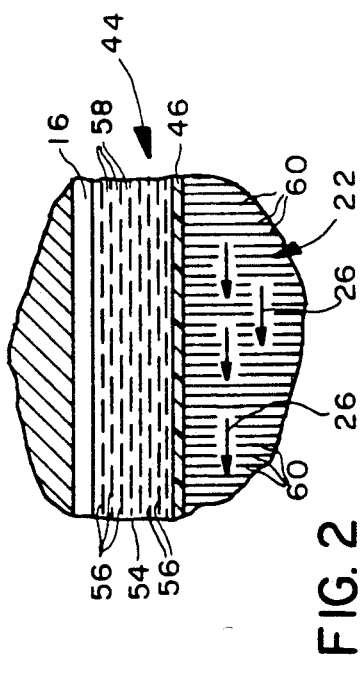
Figure 3:
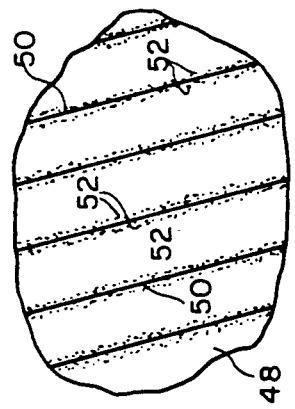
FIG. 3 is a fragmentary, developed view of a ribbon employed in one embodiment of the invention.

Referring to FIG. 2, the sleeve 44 is preferably made up of three components. The radially inner component 46 is a continuous film of polyimide material. The film 46 may be formed in any suitable fashion, but one preferred means is illustrated in FIG. 3. According to the invention, a polyimide ribbon 48 is helically wound upon a cylindrical mandrel (not shown) having an outer diameter sized to provide the desired inner diameter of the sleeve 44. The edges 50 of the ribbon 48 are tightly abutted or, more preferably, slightly overlapped. They are then sealed with a polyimide adhesive indicated by the stippling 52 as illustrated in FIG. 3.

Prior to the winding, it is desirable that the surface of the ribbon 48 that is to form the radially outer surface of the film 46 be chemically etched. This may be done by any of a variety of known means and serves not only to assure that the adhesive 52 will bond well to the ribbon to assure a seal at the edges 50, it also serves to assure that a bond will be achieved between the film 46 and a radially outer composite component 54 of the sleeve 44. The composite component 54 is a cylindrical sleeve-like element formed of a plurality of plies each shown schematically at 56 of wound fibrous material such as carbon fiber. Each ply 56 is impregnated in a matrix of resin illustrated by the unshaded, unlined areas 58 shown in FIG. 2. In a preferred embodiment, the resin 58 is a polyimide resin such as that known as PMR-15 developed by NASA. The carbon fibers making up the plies 56 are of conventional size and shape and typically will be applied by winding in a tow of about 0.2 inches in width.

The use of polyimide in forming the film 46 takes advantage of the high temperature resistance qualities of polyimide. In addition, it takes advantage of the chemical resistant qualities of the material so that the same is not affected detrimentally by contact with the coolant flow to the rotor.

The use of polyimide as the matrix 58 likewise takes advantage of the high temperature resistance qualities of this resin and assures, particularly when the outer surface of the sleeve 46 is etched as mentioned previously, that there will be an excellent bond between the film 46 on the one hand and the composite component 54 of the sleeve on the other.

Thus, when the rotor 22 is made up of laminations such as illustrated at 60 in FIG. 2, coolant in the flow paths 26 may weep radially outwardly at the interface of the laminations 60, but will be halted from further migration radially outward by the film 46. At the same time, the wound fiber of the plies 56 together with the matrix 58 provide for retention of windings 24 and prevent deformation of other components of the rotor as well.

To provide for good containment, in a preferred embodiment, there are twelve of the plies 56. Of those plies, eight are wound generally circumferentially to provide a high measure of hoop strength to the sleeve 44 necessary to achieve the desired containment. The remaining four plies are wound at a predetermined angle to prevent the generation of thermally induced stresses or relative movement between the sleeve 44 on the one hand and the rotor 22 on the other. More particularly, the fibrous material used in forming the plies 56 will have two coefficients of thermal expansion while the resin matrix 58 will have a second and different coefficient of thermal expansion. Where carbon fiber is used in forming the plies 56 as is preferred, it will be appreciated that it has two coefficients of thermal expansion, one along its length and the other transverse to its length. The latter will be positive while the coefficient of thermal expansion along its length will be negative, which is to say the fiber will tend to shorten as temperature increases. Conversely, most resins, and polyimide is no exception, have a relatively high, positive coefficient of thermal expansion.

Consequently, by providing some of the plies 56 with a substantial axial component in the winding process, the tendency of the carbon fibers to shorten when exposed to heat coupled with the fact that they are embedded within the matrix resin 58, will prevent the resin matrix 58 from expanding at the rate that would be dictated by its own coefficient of thermal expansion. It has been found that if the angle of winding of the carbon fibers is appropriately chosen, the overall coefficient of thermal expansion of the sleeve 44 can be made to equal that of the rotor 22.

Figure 4:
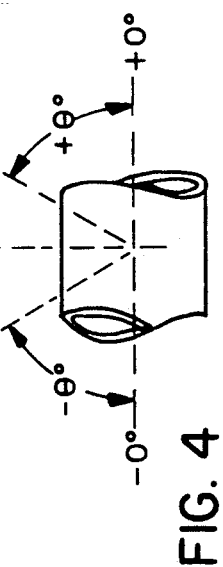
FIG. 4 is a schematic to provide reference points for a portion of the disclosure.

Using typical ferrous material for forming the laminations 60 and employing polyimide resin and carbon fibers in forming the sleeve 44, it has been determined that the direction of wind of such fibers may be about ±65° to the axis of rotation 23 of the rotor 22. This angle is indicated as plus or minus e as illustrated in FIG. 4.

Optimally, the carbon fiber plies 56 providing hoop strength may be wound at 90° but for manufacturing purposes so as to allow the tow to be advanced along the length of the mandrel bearing the film 46 upon which the plies 56 are wound, the circumferential plies 56 are wound at ±89° in a preferred embodiment.

The best mode contemplated involves twelve plies as mentioned previously and they are wound as follows: +65°, −65°, +89°, −89°, +89°, −89°, +89°, −89°, +89°, −89°, −65°, +65°. If desired, the order of the 65° wraps may be reversed as may the order of the 89° wraps. The winding pattern may be either helical as shown in FIG. 5 or biaxial as shown in FIG. 6.

Where other materials are used, the angles may be changed. Thus in the broadest sense, a ± range between 0° and 90° is contemplated. Usually the winding angle will be in the ± range between 90° and 45°.

From the foregoing, it will be readily appreciated that a composite rotor sleeve made according to the invention possesses a number of advantages. For one, it provides a positive means in the form of the film 46 of preventing any coolant from weeping into the air gap 16 whereat it might result in windage losses. For another, it allows the use of high strength composite materials in forming the sleeve 44 which are non-magnetic. Because they are of high strength, the overall width of the air gap may be minimized due to the relatively small thickness of the sleeve 44 and because the material used is a composite, it is non-magnetic and does not interfere with magnetic flux flow paths in such a way as to cause inefficiency in generator operation.

In addition, the use of composite in forming the sleeve 44 enables the use of materials having different coefficients of thermal expansion thereby allowing one material's reaction to heat to be employed to oppose that of the other material and achieve a desired match whereat the overall coefficient of thermal expansion of the sleeve is equal to that of the rotor 22 to prevent relative movement between the two or the generation of substantial thermal stresses at their interface which could lead to premature failure.

What is claimed is:

1. In a dynamoelectric machine, the combination of:
a rotor adapted to be journaled for high speed rotation about an axis;
electrical windings carried by said rotor;
means for defining a flow path for a coolant through said rotor in heat exchange relation with said windings;
a composite sleeve including fibrous material surrounding said rotor and containing said windings during speed rotation of said rotor and a resin, said fibrous material comprising elongated wound fibers, one of said resin and said fibers having a negative coefficient of thermal expansion, the other of said resin and said fibers having a positive coefficient of thermal expansion, at least some of said fibers being wound at a preselected angle between 0° and 90° to said axis whereat the coefficient of thermal expansion of said sleeve is about the same as that of said rotor; and
a continuous film of polyimide material on the interior of said sleeve and interposed between said sleeve and said rotor for preventing coolant from said flow path from passing through said sleeve.

2. The dynamoelectric machine of claim 1 wherein said continuous film is defined by a helically wound ribbon of film having its edges sealed with an adhesive.

3. The dynamoelectric machine of claim 2 wherein said adhesive is a polyimide adhesive.

4. The dynamoelectric machine of claim 1 wherein said fibers are carbon and said resin is polyimide and said angle is in the range of between about 90° and 45°.

5. The dynamoelectric machine of claim 4 wherein said angle is about ±65°.

6. The dynamoelectric machine of claim 1 wherein said sleeve and said film are shrink fitted on said rotor.

7. The dynamoelectric machine of claim 1 wherein said sleeve and said films are bonded to each other.

8. In a dynamoelectric machine, the combination of:
a rotor adapted to be journaled for high speed rotation about an axis;
electrical windings carried by said rotor;
means for defining a flow path for a coolant through said rotor in heat exchange relation with said windings;
a composite sleeve including elongated wound fibers in a matrix of resin surrounding said rotor and containing said windings during speed rotation of said rotor, one of said resin and said fibers having a negative coefficient of thermal expansion, the other of said resin and said fibers having a positive coefficient of thermal expansion, at least some of said fibers being wound at a preselected angle between 0° and 90° to said axis whereat the coefficient of thermal expansion of said sleeve is about the same as that of said rotor; and
a continuous film of coolant and high temperature resistant material on the interior of said sleeve and interposed between said sleeve and said rotor for preventing coolant from said flow path from passing through said sleeve.

9. The dynamoelectric machine of claim 8 wherein said resin and said film are bonded together.

10. The dynamoelectric machine of claim 9 wherein both said resin and said film are polyimide.

11. In a dynamoelectric machine, the combination of:
a rotor adapted to be journaled for high speed rotation about an axis;
electrical windings carried by said rotor; and
a composite sleeve including fibers in a matrix of resin surrounding said rotor and containing said windings during high speed rotation of said rotor, said fibers being wound within said sleeve in a plurality of plies at differing angles to said axis and being formed of a material having a first coefficient of thermal expansion, said resin having a second and different coefficient of thermal expansion, at least one of said angles being chosen so that said composite sleeve has a third coefficient of thermal expansion that is about equal to the coefficient of thermal expansion of said rotor.

12. The dynamoelectric machine of claim 11 wherein said sleeve further includes a radially inner high temperature and coolant resistant film about said rotor; and
means for circulating a coolant within said rotor in heat exchange relation with said windings.

* * * * *

UNITED STATES PATENT AND TRADEMARK OFFICE
CERTIFICATE OF CORRECTION

PATENT NO. : 5,122,704
DATED : June 16, 1992
INVENTOR(S) : Anthony Blakely, et. al.

It is certified that error appears in the above-indentified patent and that said Letters Patent is hereby corrected as shown below:

Title page, item [75], Inventors: after "Clarence F. Dolan", insert--Timothy S. Konicek--. "Both of Rockford" should be changed to --all of Rockford--.

Signed and Sealed this

Twentieth Day of September, 1994

Attest:

BRUCE LEHMAN

Attesting Officer

Commissioner of Patents and Trademarks